Oct. 18, 1927.
A. WEILAND
1,645,562
BUMPER CONSTRUCTION
Filed March 18, 1926  3 Sheets-Sheet 1
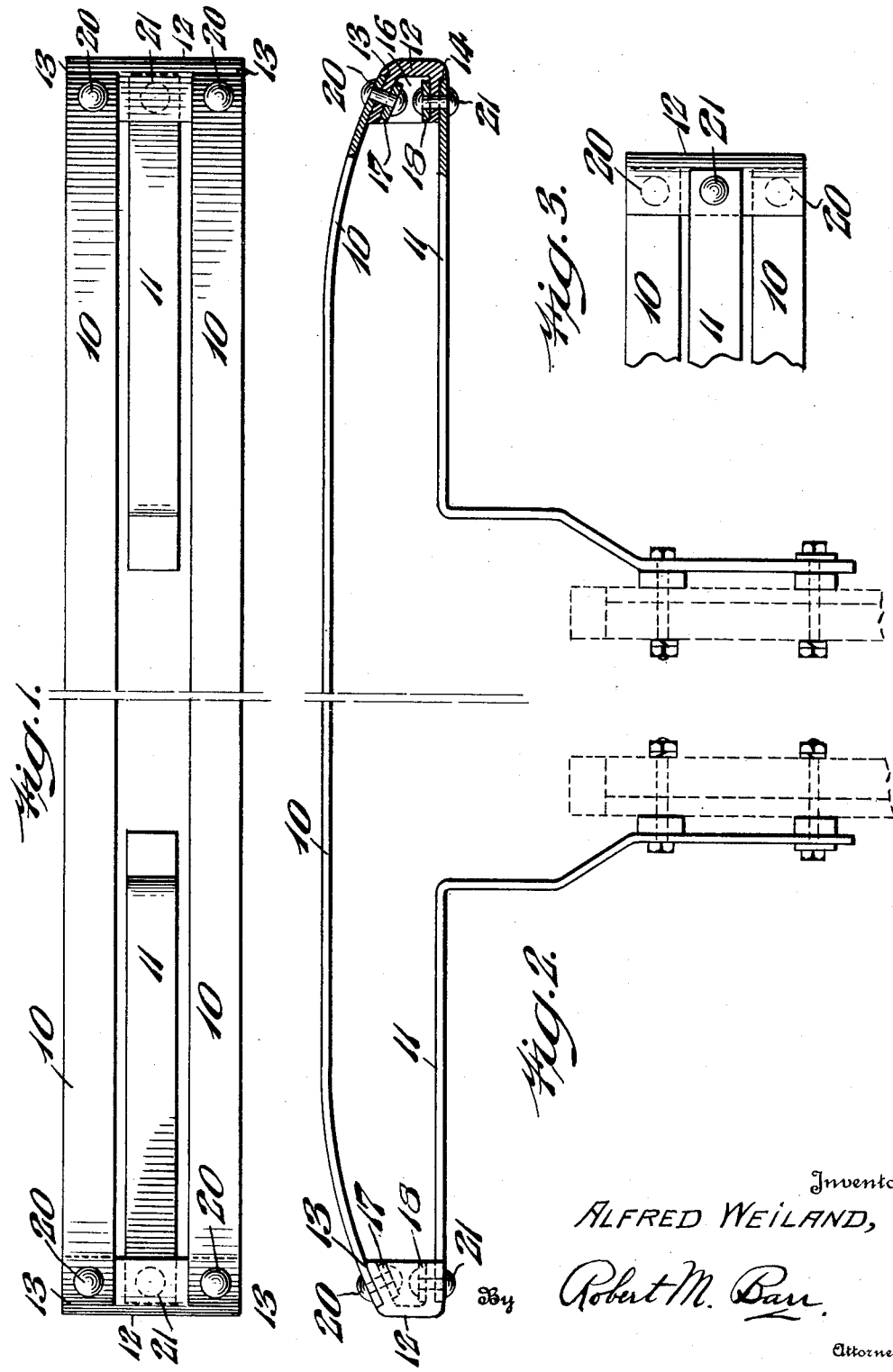
Inventor
ALFRED WEILAND,
By Robert M. Barr.
Attorney Oct. 18, 1927.　　　　　　　　　　1,645,562
A. WEILAND
BUMPER CONSTRUCTION
Filed March 18, 1926　　　　3 Sheets-Sheet 2
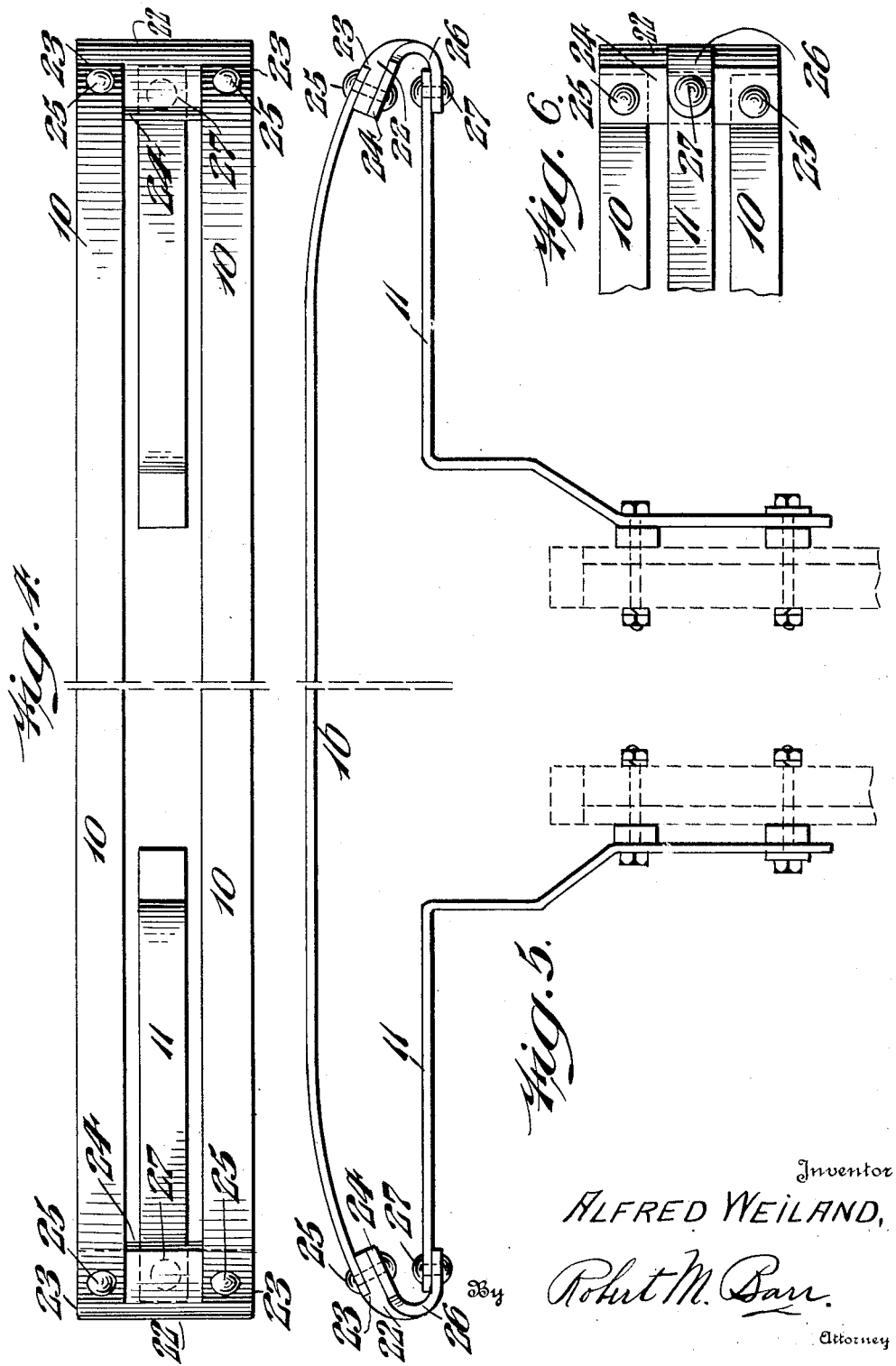
Inventor
ALFRED WEILAND,
By Robert M. Barr.
Attorney

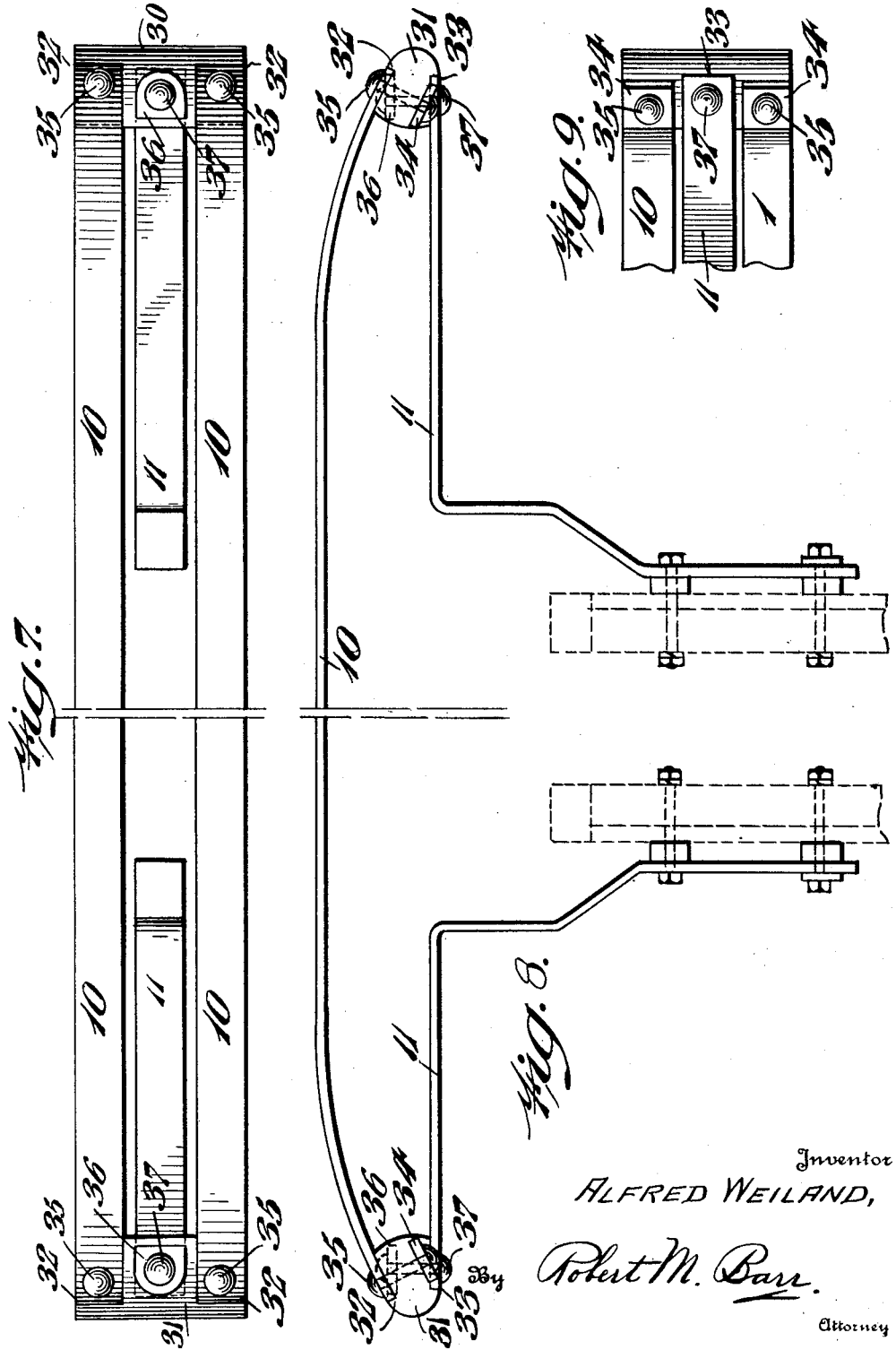

Patented Oct. 18, 1927.

1,645,562

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

BUMPER CONSTRUCTION.

Application filed March 18, 1926. Serial No. 95,635.

The present invention relates to vehicle bumpers and more particularly to an improved means for connecting the outer ends of impact and rear bars of such bumpers.

Some of the objects of the present invention are to provide an improved end construction for bumper bars; to provide a bumper end construction which will reduce the cost of manufacture of bumpers; to provide means for eliminating rattles in bumpers; to provide means for increasing the flexibility of bumpers of the spring bar impact type; to provide an end construction for bumper impact bars whereby the cushioning action of the bumper is more effective; to provide a bumper end construction which will not scratch or mar any surface with which it contacts; to provide an improved non-rigid connection between the front and rear bars of a bumper whereby flexibility is obtained in any direction of an applied force; and to provide other improvements as will hereinafter appear.

In the accompanying drawings Fig. 1 represents a front elevation of a bumper provided with an end construction embodying one form of the present invention; Fig. 2 represents a plan of the same; Fig. 3 represents a detail showing the end construction of Fig. 1 in rear elevation; Fig. 4 represents a front elevation of a bumper provided with an end construction embodying another form of the invention; Fig. 5 represents a plan of the form shown in Fig. 4; Fig. 6 represents a detail showing the end construction of Fig. 4 in rear elevation; Fig. 7 represents a front elevation of a bumper provided with an end construction embodying still another form of the invention; Fig. 8 represents a plan of the bumper construction of Fig. 7; and Fig. 9 represents a detail in rear elevation of one end of the bumper shown in Fig. 8.

Referring to Figs. 1, 2 and 3 of the drawings, a bumper representative of the spring impact bar type, having two impact bars 10 and a rear bar 11, has been selected as illustrative of the application of the present invention. It is to be understood, however, that the invention is applicable to many bumper constructions and can be applied to bumpers having one impact bar or more than the two bars here shown, and also to various modified arrangements of the rear bar or rear bars.

For connecting the adjacent ends of the impact bars 10 with the rear bar 11, two cushioning elements 12 are provided and as both are of like construction this description will be confined to one but the same reference numbers for like parts will be applied to the other. In this form of the invention the cushioning element 12, which may be of rubber, or rubberized fabric, or any other resilient material suitable for the purpose, is molded to have dimensions corresponding generally in length to the width of the bumper to which it is applied; in width to the spacing between the front and rear bars of the bumper; and in thickness sufficient to provide a substantial cushioning body. In molding the element 12 it is formed with upper and lower recesses 13 at one side to form seats for the ends of the impact bars 10, and with an intermediate recess 14 at the opposite side to form a seat for the end of the rear bar 11.

In order to provide suitable means for attaching the respective bars to the element 12, the inner face of the latter is molded with a pocket 16 of a depth to receive clamping plates 17 and 18 with which fastening rivets 20 and 21 cooperate to hold the ends of the respective bars 10 and 11 fast to the cushioning element 12. This pocket 16 leaves a relatively thick outer or impact wall to resist end impacts but lends added flexibility to the body of the element and supplements the shock absorbing properties of the spring impact bars 10. The exposed outer face of the element 12 may be variously shaped but generally considered it is more or less rounded and is given a neat appearance by shaping its front and rear portions to conform to the contour of the attached bars 10 and 11. Thus the rearwardly curved ends of the impact bars 10 merge into the curve of the element 12 and being flush therewith give a workmanlike finish, without leaving sharp edges exposed.

In the form of the invention shown in Figs. 4, 5 and 6, connecting means for the front and rear bars 10 and 11 are provided, each consisting of a cushioning element 22 of rubber or other suitable resilient material having a length substantially corresponding to the width of the front of the bumper. The exposed face of the element 22 is molded to conform generally with the curvature of the impact bars 10 and has upper and lower recesses 23 to receive respectively the bars 10. A backing plate 24 is located as a base for the element 22 and rivets 25 respectively clamp the impact bars 10 and element 22 together.

For connecting the cushioning element 22 to the rear bar 11, the plate 24 is provided with a reversely turned tongue 26 which is fastened by rivets 27 to the rear bar 11. Thus in plan the plate 24 and tongue 26 appear as substantially V-shaped with a rounded apex to conform to the contour of the impact face of the element 22.

In the form of the invention shown in Figs. 7, 8 and 9, cushioning elements 30 are provided to connect the ends of the front and rear bars 10 and 11, each element being formed of rubber or equivalent resilient material. The length of this element 30 corresponds substantially to the width of the impact face of the bumper, and the transverse section of the element 30 is such as to bridge the space between the converging ends of the bars 10 and 11 and form a rounded nose 31 projecting beyond the said ends for the purpose of providing a cushioning abutment. The front face of the element 30 is provided with upper and lower recesses 32 to respectively seat the impact bars 10 flush with the outer wall of the element, while the rear face has an intermediate recess 33 to likewise seat the rear bar 11. Molded into the rear face of the element 30 are plates 34 respectively opposite the recesses 32 in order to receive the fastening rivets 35 by which the respective bars 10 are anchored to the element 30. Similarly a plate 36 is molded into the front face of the element 30 opposite the recess 33 to reenforce the fastening of the rear bar 11 by a rivet 37. Thus the two impact bars 10 and the rear bar 11 are connected together without metal to metal contact and a flexible non-rattling connection is made which functions as an auxiliary shock absorbing means.

The cushioning elements in any form of the invention are of rugged construction and sufficiently thick walled to resist giving or flexing under impacts which can be effectively absorbed by the spring action of the impact bars. When major impacts or impacts which would bend the impact bars so that permanent distortion might take place are received, then the cushioning elements yield to supplement the absorbing action and the consequent compression of the cushioning elements prevents damaging transmission of the force of impact to the vehicle frame. In other words, the cushioning elements while resilient and flexible have an inherent rigidity which is necessary for them to act as effective mountings for the bumper ends. Since by the use of the cushioning elements the ordinary bolts employed to connect bumper ends are dispensed with, the present construction allows lateral flexing; that is, movement of the impact bars transverse of the vehicle and relative to the rear bar, and therefore a result not heretofore attained because ordinary bumper constructions have no means for absorbing impacts received on the ends of such bumpers.

Furthermore, by providing resilient portions projecting beyond the metal ends of the impact bars any object encountered by these portions meets a yielding surface so that the blow is softened and the surface of the object is not scratched or otherwise damaged. Also the absence of two metal parts in contact eliminates rattle and noise which is generally produced by the vibration of the vehicle in use.

While three forms are shown in which this invention may be embodied, it is to be understood that the invention is not limited to any specific construction, but might be applied to various forms without departing from the spirit of the invention or the scope of the appended claims.

Having thus described my invention, I claim:

1. In a bumper construction, an impact bar, a rear bar, cushioning elements projecting beyond the respective ends of said impact bar and said rear bar and molded with seats to receive the respective ends of said bars, and means to fasten said elements to said bars.

2. In a bumper construction, an impact bar, cushioning members respectively seating the ends of said impact bar, a back plate for each cushioning member separate means for fastening said back plates, cushioning members, and impact bars together, a rear bar, and tongues respectively extending from said back plates and connected respectively to the ends of said rear bar.

Signed at Philadelphia, county of Philadelphia, State of Pennsylvania, this 16th day of March, 1926.

ALFRED WEILAND.